United States Patent [19]

Reip

[11] 4,220,074

[45] Sep. 2, 1980

[54] SWITCHING VALVE

[75] Inventor: Raymond G. Reip, Clarendon Hills, Ill.

[73] Assignee: Vapor Corporation, Chicago, Ill.

[21] Appl. No.: 800,293

[22] Filed: May 25, 1977

[51] Int. Cl.[3] .................... F15B 13/043; F16K 25/00; B32B 27/06

[52] U.S. Cl. ................................ 91/453; 137/625.64; 137/625.68; 251/174; 428/422

[58] Field of Search ........... 137/625.6, 625.64, 625.63, 137/625.25, 625.68, 636.1, DIG. 2; 91/461, 304; 251/26, 174; 428/422

[56] References Cited

U.S. PATENT DOCUMENTS

| | | | |
|---|---|---|---|
| 1,690,767 | 11/1928 | Bloch | 137/636.1 |
| 1,928,452 | 9/1933 | Haywood | 137/636.1 |
| 2,376,022 | 5/1945 | Wolcott | 137/636.1 |
| 2,603,192 | 7/1952 | Kensok | 137/625.68 |
| 2,955,617 | 10/1960 | Collins | 137/625.64 |
| 3,304,221 | 2/1967 | Eggleton | 428/422 |
| 3,340,897 | 9/1967 | Nevulis | 137/625.6 |
| 3,370,612 | 2/1968 | Holl | 251/174 |
| 3,406,701 | 10/1968 | Meulendyk | 137/625.64 |
| 3,556,154 | 1/1971 | Kramer | 137/625.64 |
| 3,599,675 | 8/1971 | Sievenpiper | 137/636.1 |
| 3,776,276 | 12/1973 | Stitler | 251/174 |
| 3,790,127 | 2/1974 | Reip | 137/596.16 |
| 3,838,710 | 10/1974 | Reip | 137/596.15 |
| 3,922,955 | 12/1975 | Kast | 137/625.68 |
| 4,048,370 | 9/1977 | Orkin et al. | 428/422 |
| 4,074,011 | 2/1978 | Teramae et al. | 428/422 |

FOREIGN PATENT DOCUMENTS

| | | | |
|---|---|---|---|
| 435647 | 12/1928 | Italy | 137/636.1 |

*Primary Examiner*—Martin P. Schwadron
*Assistant Examiner*—A. Michael Chambers
*Attorney, Agent, or Firm*—Francis J. Lidd

[57] ABSTRACT

A pilot operated switching valve includes a sliding spool that is actuated by pilot pressure to control fluid through the valve to a prime mover. The ends of the spool are exposed to pilot pressure that moves the spool within the valve housing to control fluid flow through passages to and from the spool. The passages are sealed by the spool at selected positions to minimize internal leakage and also to allow the valve to hydraulically lock the prime mover. The switching valve also includes a manual switch that is in fluid communication with a source of pressurized fluid. The manual switch may be manually actuated to direct pilot fluid to one of the two ends of the sliding spool thereby manually actuating the valve.

14 Claims, 11 Drawing Figures

FIG. 7
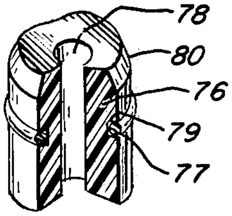
FIG. 8
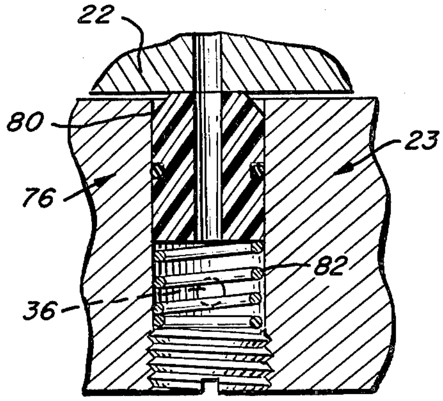
FIG. 10
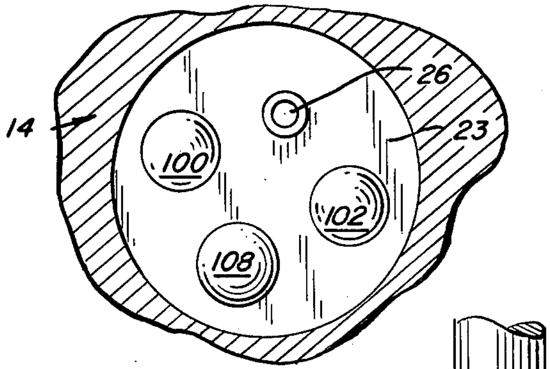
FIG. 9
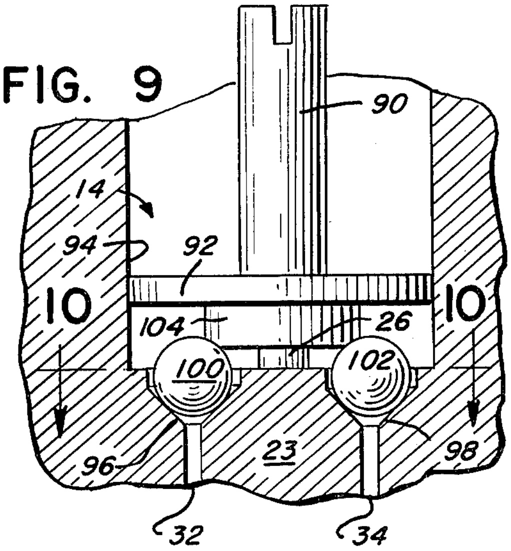
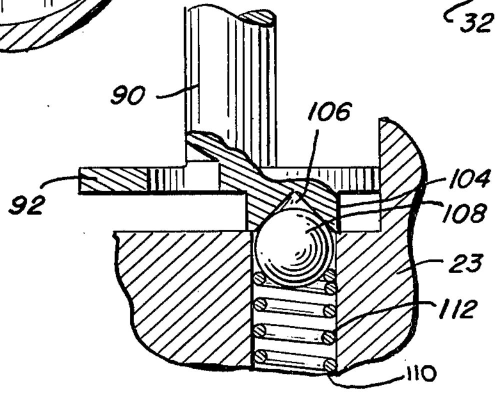
FIG. 11

SWITCHING VALVE

BACKGROUND OF THE INVENTION

A. Field of the Invention

The present invention relates to switching spool valves.

B. Description of the Prior Art

Prime movers of the type including a double acting hydraulic cylinder and used to control the operation of a large device such as a gate valve on an oil tanker requires a switching valve that is capable of handling high pressure hydraulic fluid. Typical prior art valves employ a pilot valve that is coupled to and controlled by one or more poppet valve assemblies. Prior art pilot and poppet valve assemblies are illustrated in U.S. Pat. Nos. 3,790,127 and 3,838,710 owned by the assignee of the present invention and incorporated by reference herein.

In particular U.S. Pat. No. 3,838,710 discloses a poppet valve assembly that accomplishes essentially the same function as the invention of the application. while the prior unit functions satisfactorily, the large number of moving parts and highly accurate machine parts require substantially reduced reliability and increases the manufacturing cost of the overall system.

The prior art poppet valve systems are also bulky due to the four separate piston operated poppet valves utilized. In addition, the poppet valve system is large due to the size and capacity of the individual poppets.

Another valve that may be employed in this type of system employs a sliding spool for controlling the hydraulic circuitry. A spool design has the advantage of greatly reduced simplicity of design and umber of components. However, prior art spool valves are characterized by a large amount of fluid leakage between the spool and its housing making them unfit for a switching function. An additional shortcoming of prior art valves lie in their inability to "lock" a slave actuator in a predetermined position, requiring an additional "check" valve in each line to perform the function.

Inability to "lock" a prime mover, and unreliable operation in hydraulic circuits where substantial pressure differentials occur "across" the spool have been a problem in prior art valves. Pressure differentials "across" the spool and resultant forces on the spool have heretofore tended to freeze the spool in its cavity and prevent motion particularly after the valve has been inoperative for a considerable length of time. Efforts to overcome this difficulty have included balancing parts and adjustment of spool pressure areas. However, these approaches have generally resulted in increased leakage around the spool resulting in loss of the "locking" feature.

SUMMARY OF THE INVENTION

An object of the present invention is to provide a new and improved device for controlling the fluid flow from a fluid source to a prime mover.

Another object of the present invention is to provide a new and improved switching valve including a sliding spool that is sealed to prevent leakage.

An additional object of this invention is the provision of a fluid switching valve which in the absence of pilot valve flow or in case of signal failure, locks its associated prime mover in a last position.

A further object of the invention is a self locking low leakage switch valve utilizing machined seals and operating surfaces.

An additional object of the invention is provision of a hydraulic switching valve which operates reliably under conditions of spool force imbalance due to external circuit pressure differentials.

A still further object of the invention is to provide a low leakage switching spool valve in which the sliding seal surfaces do not require a high precision machining and/or lapping operation, and where the moving spool member portion of the sliding seal surface is finished with a solid lubricant, preferably Teflon infused anodizing or metallic plating.

Briefly, the above and other objects and advantages are achieved by providing an improved switching valve that includes a sliding spool valve with at least one end that is in fluid communication with a source of pilot fluid. The interaction of the end and the fluid provides the actuating force for sliding the spool within the housing.

The spool is in fluid communication with one or more passages and operates to communicate a source of pressure to one passage on one side of a prime mover such as a double acting cylinder and to connect the other side of the prime mover to a reservoir or tank.

In addition, the valve also includes a manually actuated valve element. The valve element is operable to connect the end of the spool valve to the source of fluid pressure if the source of pilot fluid is terminated.

To provide a low leakage valve, the passage ports in fluid communication with the sliding spool valve each includes a new and novel sliding seal that is biased into sealing contact with the sliding spool.

BRIEF DESCRIPTION OF THE DRAWINGS

The above and other objects and novel features of the present invention will become apparent from the following detailed description of a preferred embodiment of the invention illustrated in the accompanying drawings, wherein:

FIG. 7 is a cut-away view of a sealing element;

FIG. 8 is a partial, cut-away view of the sealing element mounted in the switching valve;

FIG. 9 is a view of the manual valve;

FIG. 10 is a view taken along line 10—10 in FIG. 9; and

FIG. 11 is a view of a portion of the manual valve.

DETAILED DESCRIPTION OF A PREFERRED EMBODIMENT

Figure 1:
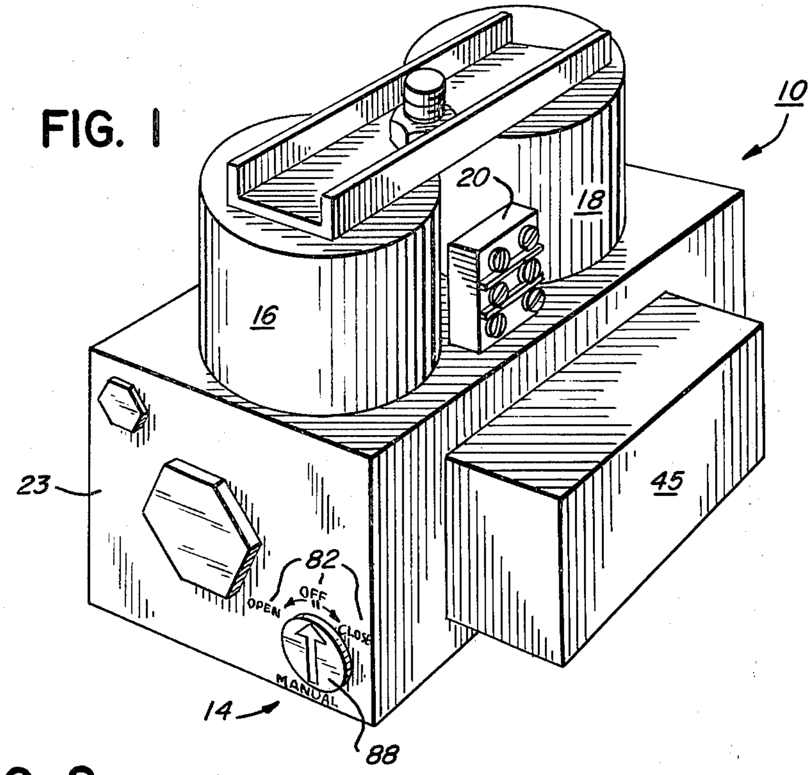
FIG. 1 is a perspective view of the switching valve constructed in accordance with the principles of the present invention.
Figure 2:
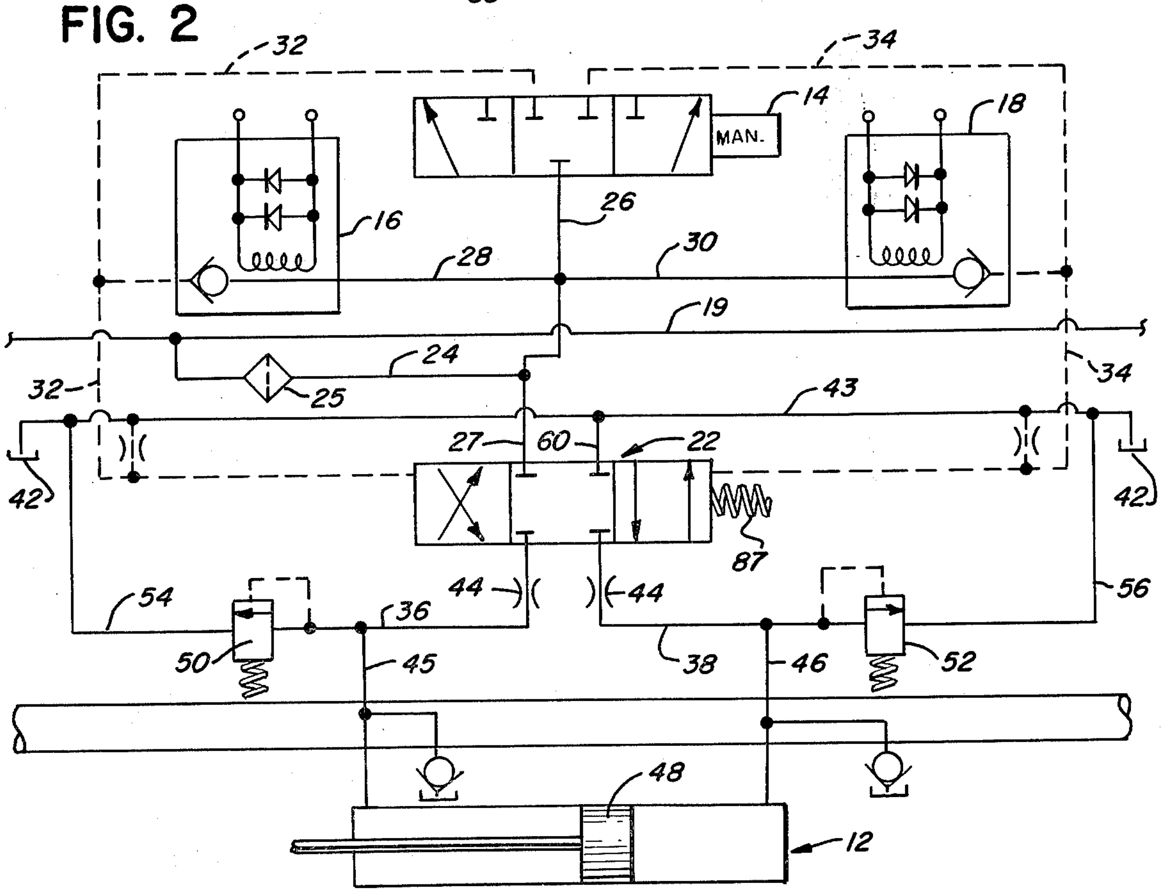
FIG. 2 is a hydraulic schematic diagram of the valve connected to a prime mover.

Having reference now to the drawings and initially to FIG. 1, there is illustrated a hydraulic switching valve generally designated by the reference numeral 10. The switching valve 10 may be used to control a prime mover such as the cyliner generally designated as by reference numeral 12 (FIG. 2). The cylinder 12, in a preferred embodiment, ultimately operates a large valve such as the type used in ocean going tankers.

The hydraulic valve 10 includes a low leakage, high capacity spool valve that employs novel pressure operated seals to maintain low leakage. The valve 10 further includes a manual control valve generally designated by the reference numeral 14 that may be employed if electric power of the pilot valves fail.

The switching valve 10 includes two components. The first component includes a pair of pilot valves 16 and 18. The pilot valves 16 and 18 are electrically operated and are connected to a power source through the terminal block 20. A more detailed description of the structure and operation of the pilot valves 16 and 18 is set forth in U.S. Pat. Nos. 3,838,710 and 3,790,127 incorporated by reference, as indicated above.

The second component of the valve 10 includes a spool valve 22 contained in the housing 23. It is sufficient for the purposes of the discussion of the valve 10 to note that the pilot valves 16 and 18 are electrically operated to control the flow of pressurized hydraulic fluid to actuate the spool valve 22.

The interrelationship of the different components of the valve 10 may be best ascertained by reference to FIG. 2. The pilot valves 16 and 18 are supplied with pressurized fluid from a supply line 19 through the filter 25. The filtered fluid flows through the conduits or lines 24 and 26 to the manual valve 14 and through the conduits 24, 28 and 30 to the pilot valves 16 and 18. Pressurized fluid is also supplied to the spool 22 by conduits 24 and 27.

The pilot valve 16 is electrically operated to direct pressurized fluid from the line 28 to the line 32 and to one end of the spool 22. In the alternative, the pilot valve 18 may be electrically controlled to direct pressurized fluid through the conduit or line 34, to the opposite end of the spool 22. In this manner, the spool 22 is shifted in the desired direction to direct pressurized fluid from the conduit 27 through one of the conduits 36 or 38 to the prime mover 12.

For example, if the pilot valve 16 is actuated to supply fluid to the end of the spool 22, the spool 22 is shifted such that the line 38 is connected to pressurized fluid through the line 27, whereas the line 36 is connected to a reservoir 42 by the line 43. The pressurized fluid flowing through the line 38 from the line 27 passes through a speed control orifice 44 that serves to limit prime mover speed. The orifices 44 are contained in a housing 45 (FIG. 1). The pressurized fluid is directed from the line 38 to the line 46 and to the front side of a piston 48 in the prime mover 12. The rod side of the piston 48 is coupled to the line 36 through line 45 and is vented to the tank 42. In this manner, the piston 48 moves in a leftward direction as viewed in FIG. 2.

Also mounted in lines 36 and 38 are pressure relief valves 50 and 52, respectively, that are each connected to the tank 42 by conduits or passages 54 and 56, respectively. Excessively high pressures can develop in the lines 36 or 38 due to temperature rise. In this case pressure relief valves 50 and 52 will be actuated to vent the pressurized fluid to the tank 42 thereby protecting the system.

In accordance with another important feature of the present invention, there is included the manual valve 14 that may be employed to operate the spool 22 upon failure of one or both of the pilot valves 16 and 18. More specifically, the manual valve 14 is in continuous communication with the source of pressurized fluid through the conduit 26. The manual valve 14 may be actuated to a position to communicate the pressurized fluid either to line 34 or line 32 to bypass the pilot valves 16 and 18 thereby providing pressurized fluid to a selected end of the spool 22. In addition, the manual valve 14 is of a particular construction such that when released it always returns to its off position and never interferes with remote operation through pilot valves 16 and 18.

Figure 3:
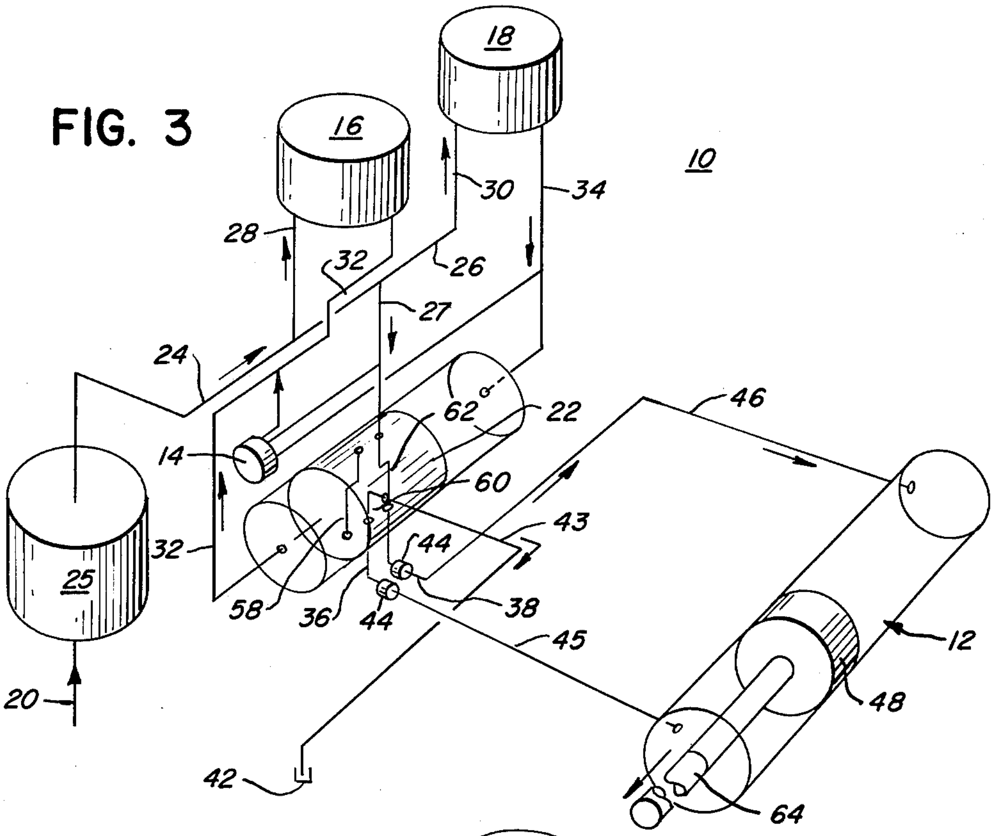
FIG. 3 is a diagrammatic illustration of the switching valve of the present invention in a second position.
Figure 4:
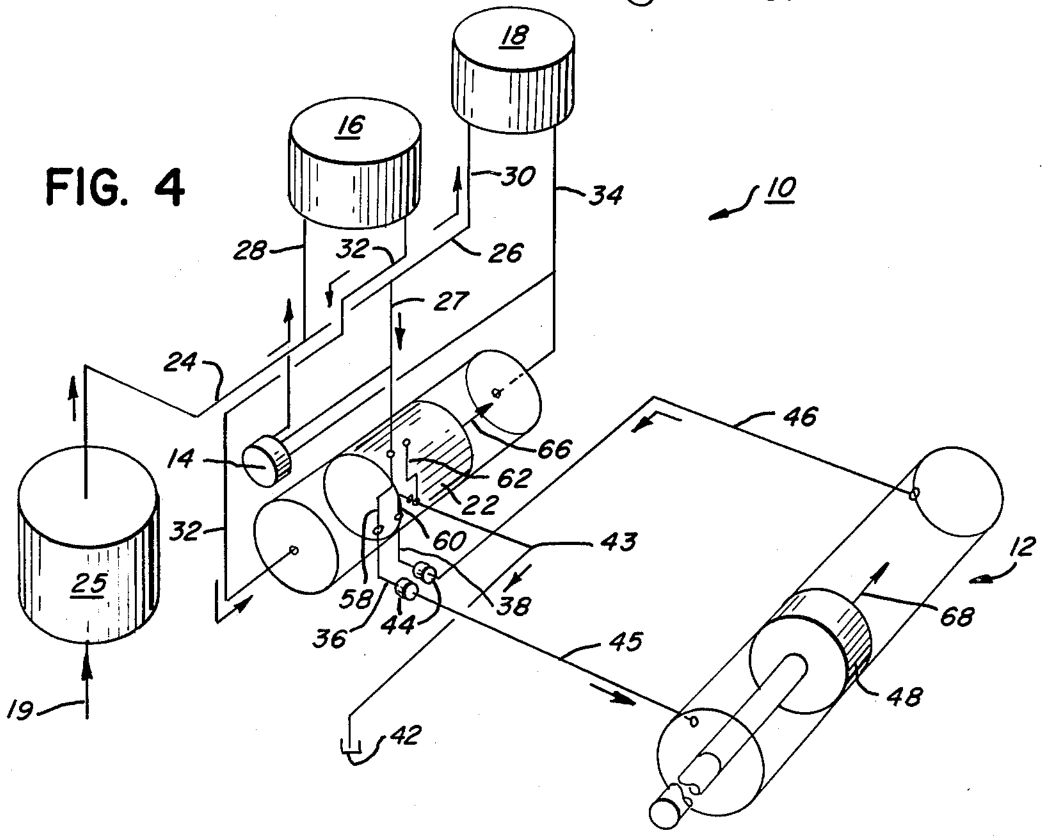
FIG. 4 is an illustration similar to FIG. 3 in a first position.

To provide a more detailed description of the operation of the spool 22, reference is now made to FIGS. 3–4. In these figures there is illustrated a diagrammatic depiction of the valve 10 in a first position moving the piston 48 in a leftward direction and in a second position (FIG. 4), moving the piston 48 in a rightward direction.

With reference initially to FIG. 3, in this illustration the pilot valve 18 is actuated to direct pressurized fluid from the conduit 30 to the conduit 34 to the end of the spool 22. As illustrated in FIG. 3, spool 22 includes three internal conduits 58, 60, and 62. In FIG. 3 the spool 22 is moved to a position under the influence of the pressurized fluid from the conduit 34 to align conduit 27 with conduit 62. In turn, conduit 62 is aligned with conduit 38 thereby directing pressurized fluid from the source to the conduits 38 and 46 to the front end of the piston 48 causing it to move in a leftward direction as illustrated by the arrow 64.

At the same time, the internal conduit or passage 60 is aligned with the conduit or passage 36 and the passage 43 that in turn is in communication with the tank 42. This vents the chamber behind the piston 48 allowing free movement of the piston 48 under the influence of the pressurized fluid introduced into the prime mover 12 by the conduit 46.

In FIG. 4, pilot valve 16 is actuated causing the spool 22 to move in a rightward direction as illustrated by the arrow 66 aligning the internal passage or conduit 58 with the conduit or passage 27 thereby coupling pressurized fluid to the prime mover 12 at the rod end of the piston 48. At the same time, passage or conduit 46 is coupled to conduit 43 and to the tank 42 through the internal conduit 60. This vents the front end of the piston 48 allowing the piston to move in a rightward direction as indicated by the arrow 68.

Figure 5:
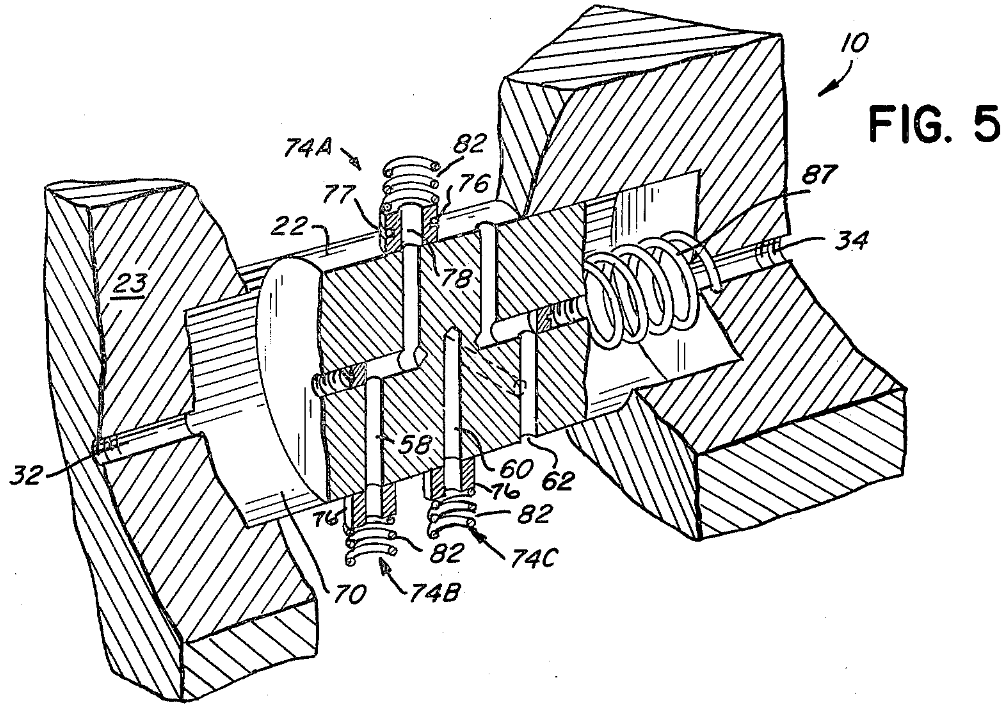
FIG. 5 is an enlarged, partially fragmented view of the valve in a first position.
Figure 6:
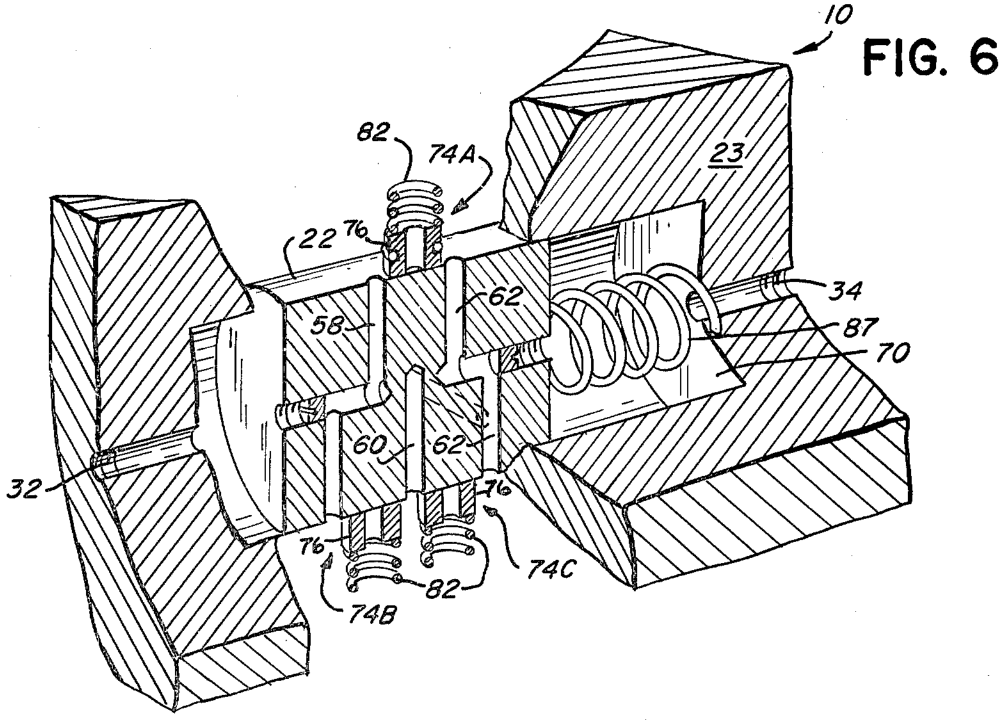
FIG. 6 is a view similar to FIG. 5 with the valve in a locking or neutral position.

Having reference now to FIGS. 5 and 6, the novel sealing arrangement of the spool 22 may be explained. The sliding spool 22 is slideably mounted within a bore 70 defined within the spool housing 23. Due to this sliding movement and the high pressurized fluids controlled by the spool 22, substantial leakage between the interface of the outer periphery of the spool 22 and the inner periphery of the bore 70 may occur since this area is vented to the tank. In accordance with an important feature of the present invention, to provide low level leakage around the spool 22, biased seals generally designated by the reference numerals 74A, 74B and 74C are employed to provide a sliding seal at the inlet and outlets of the internal bores 58, 60 and 62 in the spool 22.

More specifically, the seals 74A, 74B and 74C include a ported tube seal 76 (FIG. 7) having a self aligning semi-cylindrical seal face fabricated from a plastic material such as teflon. The tube seal 76 includes a longitudinal, axial port 78 that is adapted to communicate with one of the internal passages or conduits 58, 60 and 62. The seal 76 also includes an O-ring 77 positioned in a groove 79 defined on the periphery of the seal 76. The O-ring 77 prevents leakage around the seal 76.

A first end 80 of the seal 76 is cylindrically concave and biased by a spring 82 and the pressure in its conduit into sliding contact with the outer periphery of the spool 22. Seal 74A is positioned within conduit 27 so as to seal against fluid leakage as fluid flows from the conduit 27 to either of the internal conduits 58 or 62. Seal 74B is positioned within conduit 36 and communicates with the rod end of the piston 48 in the prime mover 12. The seal 74C is positioned within conduit 38 that is in communication with the face of the piston 48.

As indicated above, an important aspect of the invention is the provision of a low leakage spool valve which operates reliably with substantial pressure differentials across the spool. Sealing of ports in the spool 22 against seals 74A, 74B and 74C is accomplished without the precision lapping required in all prior art valves. This is accomplished through the use of resilient plastic seals (74A, 74B, 74C) and coating the ordinarily machined surface of spool 22 with a plastic infused metallic plating or anodizing. In the disclosed embodiment Teflon infused anodizing was used; however, those skilled in the art will understand that other combinations of plastic infused coatings, metallic plating or other solid lubricant coatings will also be satisfactory.

Movement of the spool 22 under substantial forces produced by pressure differentials is facilitated by the combination of plastic seals and solid lubricant coating of the plunger.

As illustrated in FIGS. 4 and 5, the spool 22 has been actuated to a position wherein pressurized fluid from the conduit 27 is communicated to the conduit 58 and from there to the conduit 36, In this position, the front end of the piston 48 is vented through conduit 46 and the internal conduit 60 to the tank 42. As a result of the bias of pressure and springs 82, the seals 74A, 74B and 74C prevent leakage along the interface between the outer periphery of the spool 22 and the inner periphery of the bore 70 during this operation of the valve 10. Furthermore, due to the low friction material from which the seal 76 is fabricated and the semi-cylindrical end 80, the spool 22 easily slides over the seals 74A, 74B and 74C within the bore 70.

In addition, construction of the valve 10 provides clearance for the piston 22 in the bore 70 such that the combination of sealed ports 74A, 74B and 74C effectively isolate the pressurized fluid of cylinder 48 from the pilot fluid pressure. Therefore, the piston-cylinder of switch valve 10 operates essentially on pilot pressure and flow providing positive rapid operation independent of the pulsations caused by operation and loading of the cylinder 48.

The pilot valve 18 may be actuated to direct pressurized fluid to the spool 22 through the conduit 34. This moves the spool 22 to a position wherein pressurized fluid from the conduit 27 is communicated to the internal port 62 providing pressurized fluid to the face of the piston 48 in the prime mover 12.

The piston rod end of the piston 48 is vented to the tank through the conduit 45 and the internal conduit 60. In this position, seals 74A and 74C seal the inlet and outlet, respectively, of the internal conduit 62 whereas the seal 74B seals the inlet of the conduit 60.

The plastic seal and low friction plunger coating described above reduce the forces necessary for spool movement under conditions of high pressure drop across the spool ports. These low forces allow use of simple and reliable means to "center" the spool when pilot flow is absent. A centering assembly consisting of a spring 87 or a similar biasing device provides fluid "locking" of the hydraulic cylinder. Locking occurs when either pilot valve 16 or 18 is de-energized, or the signal source or the power to the valves fails. Spring 87 forces return of the spool 22 to a center position where passages 58, 60 and 62 abut the spool surface, thereby blocking flow from the source 24 to the prime mover cylinder 48, and locking the cylinder in the position it was in prior to the de-energization or failure.

Having reference now to the manual valve 14, the valve 14 includes a control knob 88 (FIG. 1) rotatable relative to indicia 82 on the housing 23 indicating the various positions of the manual valve 14.

Having reference now to FIGS. 2 and 9–11 specifically illustrating the manual valve 14; as previously described, the manual valve 14 may be employed to supply pressurized fluid to either side of the piston 48 in the prime mover 12 through the spool 22 upon failure of one or both of the pilot valves 16 and 18.

The manual valve 14 is constructed such that the operater may rotate the knob 88 holding it in the chosen position for a brief period of time to allow pressurized fluid to flow to the prime mover 12 thereby moving the piston 48. Once the piston is moved, the knob 88 may be released or rotated to the off position and the prime mover 12 will be held in the desired position as a result of the introduction of pressurized fluid.

The knob 88 is coupled to a driver 90 of the manual valve 14. The driver 90 has at one end an integral plate 92. The driver 90 and the plate 92 are rotatably mounted within a bore 94 fabricated in the housing 23 of the valve 10. Communicating with the bore 94 are the conduits 32 and 34 that are directly coupled to spool 22. At the inlets of the conduits 32 and 34 are fabricated two valve seats 96 and 98, respectively; positioned within these valve seats 96 and 98 are ball valves 100 and 102.

Also in communication with the bore 94 is the supply conduit 26. The supply conduit 26 provides a constant supply of pressurized fluid within the bore 94. This pressurized fluid serves to hold the ball valves 100 and 102 within their respective seats 96 and 98.

Also formed on the plate 92 is a projection 104. The projection 104 has a bored out portion 106 that is adapted to be positioned over a detent defined by a ball 108 mounted within a bore 110 fabricated in the housing 23. The ball 108 is biased into engagement with the bore 106 by a spring 112.

The driver 90 and the knob 88 are maintained by the ball detent 108 in the off position. If it is desired to couple pressurized fluid from the conduit 26 to one of the conduits 32 or 34, the driver 90 is rotated by rotating the knob 88 and moving the projection 104 slightly off the ball detent 108. The ball valves 100 and 102 are positioned relative to the detent 108 such that as the projection 104 is slightly rotated, it engages one of the ball valves 100 and 102 moving the ball valve 100 or 102 slightly out of its seat 96 or 98. This allows pressurized fluid to flow through the selected conduit 32 or 34 actuating spool 22 and ultimately the prime mover 12.

Once the prime mover 12 has been moved to the desired position, the knob 88 may be released and it will return under the influence of the detent ball 108 to the off position. The pressurized fluid supplied by the conduit 26 will then force the ball valve 100 or 102 that was moved out of its respective seat 96 or 98 to return, terminating the flow of pressurized fluid to the prime mover 12. This action also aids the detent in returning the driver 90 and knob 88 to the off position.

Accordingly, the valve 10 is provided with a manually operable valve 14 that may be employed to actuate the prime mover 12 upon failure of one or both of the pilot valves 16 and 18. In addition, the manual valve 14 automatically returns to its off position when manual actuation is no longer required.

While the invention has been described with reference to details of the illustrated embodiment, it should be understood that such details are not intended to limit the scope of the invention as defined in the following claims.

What is claimed and desired to be secured by Letters Patent of the United States is:

1. A pilot operated switching valve operable by at least one source of low pressure pilot fluid for controlling the flow of actuation fluid from a source of high pressurized fluid to a hydraulic prime mover comprising:

a valve body;

a bore defined in said body;

a fluid flow control member of a constant diameter including a low friction outer periphery that is plastic infused metal plated to allow said control member to be slideably mounted in said bore, said member having first and second ends defining first and second pressure surfaces adapted to interact with said pilot fluid to develop a force to slide said member in said bore;

first passage means for communicating said first end of said member with said source of pilot fluid;

second passage means for communicating said second end of said member with said source of pilot fluid;

third passage means for communicating said bore with said source of pressurized fluid;

fourth passage means for communicating said bore with said prime mover;

fifth passage means defined internally in said fluid flow control member for communicating said third passage means with said fourth passage means upon actuation of said member by said pilot fluid to a preselected position within said bore and means for manually controlling the flow of fluid from said source of pressurized fluid to said bore, said manual means includes a manually operated valve plate including a bore mounted in said body, and sixth passage means for communicating said manually operated valve plate with said source of pressurized fluid, said manual means further includes seventh passage means for communicating said manually operated valve with said first passage means, and eighth passage means for communicating said manually operated valve with said second passage means, said manual valve further including at least one ball valve element and a valve element selector means for selectively moving said ball valve element out of one of said seventh and eighth passage means for allowing fluid flow therethrough, said manual valve further comprising a ball detent member including means resiliently mounting said member in said manual valve and engaging said plate for automatically returning said valve element selector means to a position out of engagement with said valve element upon release thereof.

2. The valve set forth in claim 1 further comprising means for sealing the interface between said member and said third and fourth passage means, said sealing means including a first one piece sliding seal member mounted in said fourth passage means said first seal member including a concave face, and a biasing element mounted in said fourth passage means adjacent said first seal member for biasing said concave face of said first seal member into engagement with said fluid flow control member, said sealing means also including a second one piece seal member mounted in said third passage means, said second seal member including a concave face and a second biasing element mounted in said third passage means and adjacent said second seal member for biasing said face of said second seal member into engagement with said fluid flow control means.

3. The valve set forth in claim 1 further comprising an orifice member positioned in said fourth passage means for controlling the rate of fluid flow through said fourth passage means to control the rate of actuation of said prime mover.

4. A pilot fluid operated switching valve for controlling the communicating of pressurized fluid from a source of pressurized fluid to a prime mover comprising:

a housing;

first means for communicating said housing with at least one source of pilot fluid;

second means for communicating said housing with a source of pressurized fluid;

third means for communicating said housing with said prime mover;

an elongated bore defined in said housing;

first, second and third passage means for communicating said first, second, and third means with said bore, respectively;

a plastic infused metal plated pilot fluid actuated flow control member slideably mounted in said first bore, said flow control member including at least one pressure surface in communication with said source of pilot fluid through said first passage means and said first means, said pressure surface adapted to interact with said pilot fluid to develop a flow control member actuating force, said flow control member further including at least one internal conduit for directing said pressurized fluid from said second means and said second passage means to said prime mover in a first position and to terminate flow to said prime mover in a second position at least one sliding one piece seal between said conduit and said second and third passage means, said seal including a means for biasing said seal into sealing engagement with said housing and said flow control member said seal further including a concave face engaging the periphery of said flow control member to provide a low friction self-centering sliding seal and means for manually controlling the flow of fluid from said source of pressurized fluid to said first passage means, said manual means includes a manually operated valve plate including a second bore mounted in said body, and fourth passage means for communicating said manually operated valve plate with said source of pressurized fluid, said manual means further includes fifth passage means for communicating said manually operated valve with said first passage means, said manual valve further including at least one ball valve element and a valve element selector means for selectively moving said ball valve element out of one of said fifth passage means for allowing fluid flow therethrough, said manual valve further comprising a ball detent member including means resiliently mounting said member in said manual valve and engaging said plate for automatically returning said valve element selector means to a position out of engagement with said valve element upon release thereof.

5. The valve set forth in claim 4 further comprising means in fluid communication with said first passage means for relieving pressure above a predetermined magnitude in said housing.

6. The valve set forth in claim 4 further including orifice means in said third passage means for controlling the rate of fluid flow from said valve to said prime mover.

7. The valve set forth in claim 4 further including centering means whereby said control member is returned to a pre-determined position in said first bore absent said actuating force.

8. A pilot operated switching valve for controlling the communication of a source of pressurized fluid and a fluid reservoir with a prime mover comprising:

a valve body having a fluid source inlet adapted to be coupled to said source of pressurized fluid, first and second pilot outlets adapted to be coupled to first and second pilot valves, first and second pilot inlets adapted to be coupled to said first and second pilot valves, a reservoir outlet adapted to be coupled to said fluid reservoir, and first and second prime mover ports adapted to be coupled to said prime mover;

a spool of a constant diameter slideably mounted in said body, said spool having first and second ends;

first passage means for communicating said fluid source inlet with said first and second pilot outlets;

second passage means for communicating said fluid source inlet with said spool;

third passage means for communicating said first pilot inlet with said first end of said spool valve;

fourth passage means for communicating said second pilot inlet with said second end of said spool valve;

fifth passage means for communicating said first prime mover port with said spool valve;

sixth passage means for communicating said second prime mover port with said spool valve;

seventh passage means for communicating said spool valve with said reservoir outlet;

said spool including eighth passage means internally defined in said spool for communicating said second passage means with said fifth passage means in a first position of said spool valve;

said spool further including ninth passage means internally defined in said spool for communicating said second passage means with said sixth passage means in a second position of said spool valve;

said spool further including tenth passage means internally defined in said spool for communicating said sixth passage means with said seventh passage means in said first position of said spool valve and for communicating said fifth passage means with said seventh passage means in said second position of said spool and means for manually controlling the flow of fluid from said source of pressurized fluid to said bore, said manual means includes a manually operated valve plate including a bore mounted in said body, and eleventh passage means for communicating said manually operated valve plate with said source of pressurized fluid, said manual means further includes twelfth passage means for communicating said manually operated valve with said first passage means and said first pilot outlet, and thirteenth passage means for communicating said manually operated valve with said first passage means and said second pilot outlet, said manual valve further including at least one ball valve element and a valve element selector means for selectively moving said ball valve element out of one of said twelfth and thirteenth passage means for allowing fluid flow therethrough, said manual valve further comprising a ball detent member including means resiliently mounting said member in said manual valve and engaging said plate for automatically returning said valve element selector means to a position out of engagement with said valve element upon release thereof.

9. The switching valve claimed in claim 8 further comprising restricted flow means for controlling the rate of fluid flow through said fifth and sixth passage means.

10. The switching valve claimed in claim 8 further comprising means mounted in said fifth and sixth passage means for relieving pressure above a preselected magnitude to said reservoir.

11. The switching valve claimed in claim 8 further comprising means for sealing said second, fifth, and sixth passage means at their interface with said spool valve, said sealing means including a one piece seal element having first and second ends, said first end including a self-aligning concave face, a seal element being mounted in each of said second, fifth, and sixth passage means with said first end of each of said seal element abutting said spool valve, and a biasing element mounted in each of said second, fifth, and sixth passage means, each said biasing element engaging said second end of each said seal element and biasing said first end of each said seal element into engagement with said spool valve.

12. The valve set forth in claim 8 wherein the sliding surface of said spool valve comprises a solid lubricant.

13. The valve set forth in claim 8 further comprising centering means whereby said spool in the absence of said pilot fluid is positioned with said second passage means intermediate said eighth and ninth passage means, said fifth and sixth passage means intermediate said seventh, eighth and ninth passage means.

14. The valve set forth in claim 12 wherein said centering means comprises a biasing member secured to said spool valve.

* * * * *